April 7, 1970 L. MARTHE 3,505,614

VOLTAGE TO FREQUENCY CONVERTER

Filed Nov. 30, 1966 2 Sheets-Sheet 1

LOUIS MARTHE

BY Marvin S. Blodgett

ATTORNEY

April 7, 1970 L. MARTHE 3,505,614

VOLTAGE TO FREQUENCY CONVERTER

Filed Nov. 30, 1966 2 Sheets-Sheet 2

United States Patent Office 3,505,614

Patented Apr. 7, 1970

3,505,614

VOLTAGE TO FREQUENCY CONVERTER

Louis Marthe, Pau, France, assignor to Societe Nationale des Petroles d'Aquitaine, Tour, Aquitaine-Courbevoie, France Filed Nov. 30, 1966, Ser. No. 597,977
Claims priority, application France, Mar. 9, 1966, 52,630
Int. Cl. H02m *5/30;* H03c *3/38;* H03k *7/00*
U.S. Cl. 332—9 3 Claims

ABSTRACT OF THE DISCLOSURE

This invention relates to a voltage to frequency converter and, more particularly, to apparatus for deriving from an electrical input signal an output alternating current signal whose frequency at any time is proportional to the voltage of the input signal.

In such apparatus, the charging time of the capacitor is inversely proportional to the input voltage, and the period, which comprises in addition the discharge time, is not strictly inversely proportional to the said voltage. The error becomes too great when frequencies of the order of 500 c./s. are exceeded. Various means of correcting this error have been conceived.

The present invention relates to a voltage-frequency converter in which this error is corrected by particularly simple and effective means.

The voltage-frequency converter according to the invention is essentially distinguished in that the discharge of the capacitor which it comprises is controlled by a transistor whose emitter-collector impedance is in parallel with the said capacitor, and to the base of which there are applied amplitude- and duration-calibrated pulses emanating from a threshold triggering device controlled by the input voltage, which is also applied to the emitter or to the collector of the said transistor.

Since the impedance then increases at the same time as the input voltage, the capacitor retains a residual charge which increases at the same time as the input voltage, if the pulses are appropriately calibrated, so that the quantity of electricity to be applied to the capacitor decreases, whereby it is possible to correct the aforesaid error.

In accordance with a preferred embodiment of the invention, the input voltage is applied to one of the input terminals of a differential amplifier and a total feedback loop, comprising a constant-current generator, in series with the said capacitor, connects the output of the said differential amplifier to a resistor connected to its other input terminal.

Consequenly the voltage across the terminals of the said resistor follows the input voltage, and the capacitor is charged with constant current.

The invention will be more readily understood with the aid of the following description.

Figure 1:
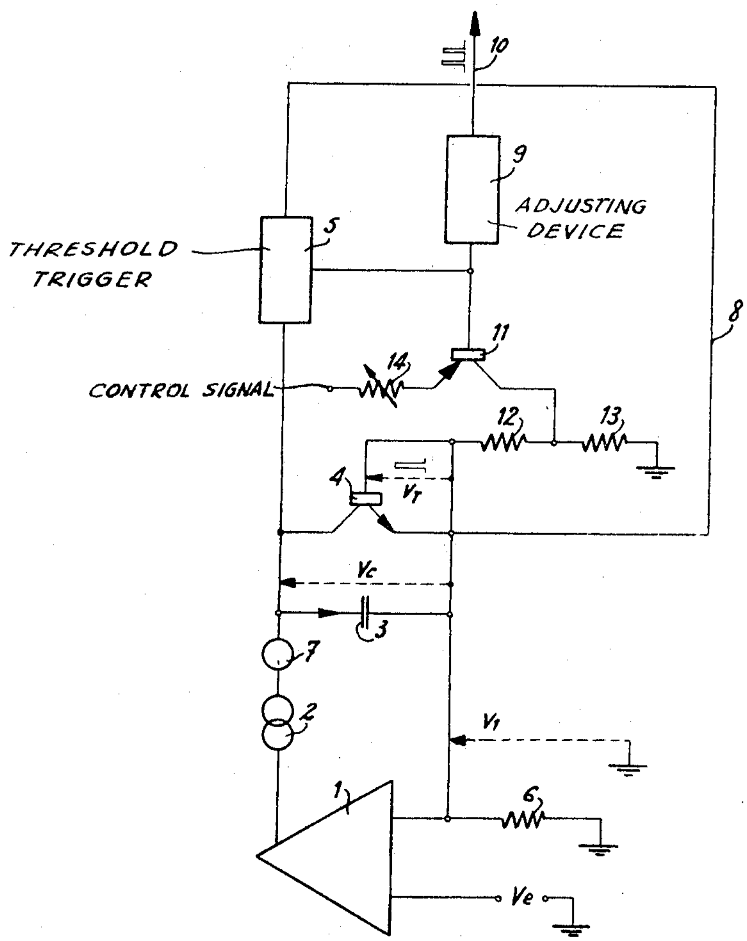
Figure 2:
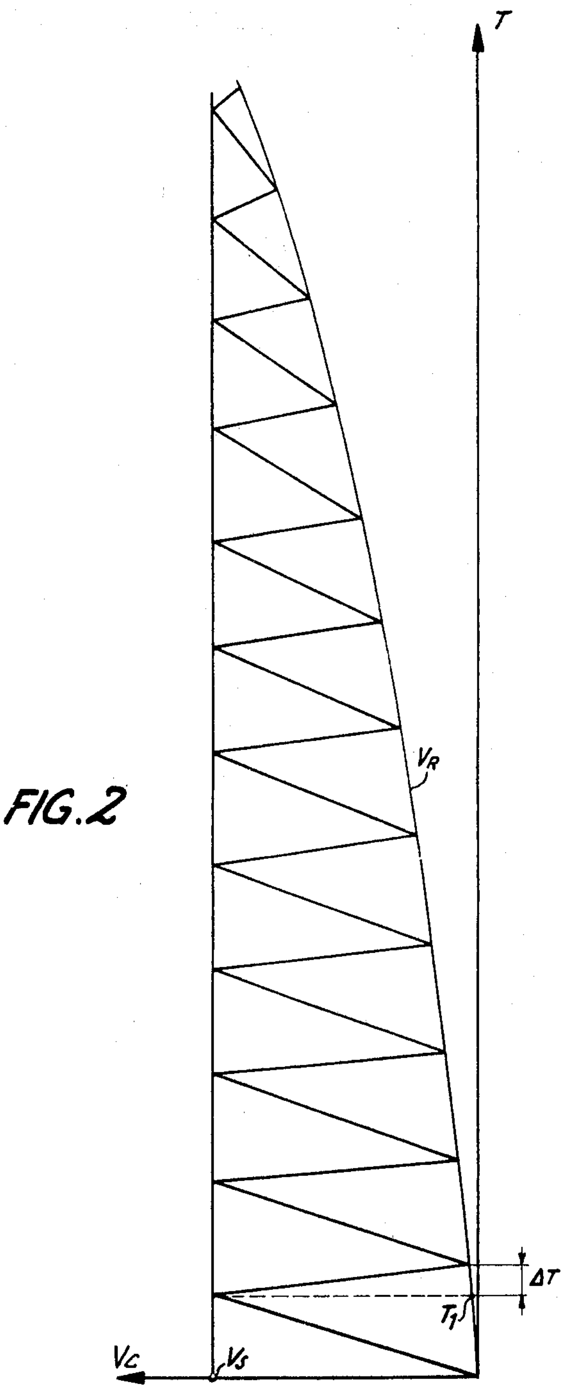

In the accompanying drawings:

FIGURE 1 is the basic circuit diagram of an apparatus according to the preferred embodiment of the invention, and FIGURE 2 illustrates the operation thereof.

The voltage-frequency converted illustrated in FIGURE 1 comprises essentially a differential amplifier 1, a constant-current generator 2, a capacitor 3, a transistor 4 controlling the discharge of the said capacitor, and a threshold triggering device 5.

The voltage $V_e$ to be converted is applied to a first input of the differential amplifier, while a resistor 6 connects the second input to ground.

The generator 2 (between its triggering input and its output), and the capacitor 3 are connected in series between the output of the differential amplifier and its second input. If desired, there may be inserted in the feedback loop thus formed two members, a contact galvanometer 7.

The voltage $V_1$ across the terminals of the resistor 6 is applied through a lead 8 to the triggering control input of the device 5. The output of the latter is connected on the one hand to a device 9 which serves to adjust the pulses generated at the frequency F by the device 5, for the purpose of their use at the output 10, and on the other hand to the base of a transistor 11 whose collector is connected to the base of the transistor 4. It will hereinafter be seen that the transistor 11 serves to amplitude-adjust the pulses transmitted to the ransistor 4, through a resistor bridge 12–13, for rendering it conductive in the appropriate manner.

In accordance with the form of construction of the circuit arrangement, the gain of the transistor 11 may be varied by means of a potentiometer 14, which is connected to a control signal for example, in a negative feedback circuit (not shown).

The design of the various devices just described is within the ability of the preson skilled in the art, and it is to be understood that FIGURE 1 is only a basic circuit diagram of the arrangement, the supply sources and other accessory members having been omitted.

In operation, as soon as the voltage $V_e$ is applied to the first input of the differential amplifier, the latter supplies at its output a voltage proportional to $V_e$, the effect of which is to cause a certain current I proportional to $V_e$ to be fed to the generator 2. This current I instantaneously develops a voltage $V_1$ across the terminals of the resistor 6.

Owing to the total feedback thus obtained, the gain of the differential amplifier is so adjusted that $V_1$ is constantly equal to $V_e$.

The generator 2 may consist, for example, of a simple transistor whose base is connected to the output of the differential amplifier, and which supplies a constant current for a given value of its base voltage.

The capacitor 3 is thus charged with constant current, so that the voltage $V_c$ across its terminals increases linearly as a function of time.

As soon as this voltage $V_c$ reaches the triggering threshold $V_S$ of the device 5 (instant $T_1$, FIGURE 2), the latter applies a pulse to the base of the transistor 11, which transmits it, after the adjustment of a voltage $V_T$, to the base of the transistor 4. The transistor 4 is thus rendered conductive for the duration $\Delta T$ of the pulse, and then offers to the capacitor a low-resistance discharge path consisting of the emitter-collector impedance of the transistor 4. At the end of the interval of time $\Delta T$, the capacitor commences to be recharged by the current I to the value $V_S$, which produces a further discharge, and so on.

Since the current I is constantly proportional to $V_e$, the charging time of the capacitor is roughly inversely proportional to $V_e$, and since the discharge time is short in relation to the charging time, the frequency F of the effect is roughly proportional to $V_e$. These are thus collected at the output 10 of the arrangement frequency pulses F proportional to the amplitude of the input voltage to be converted.

Since the variations of the voltage $V_e$ are very slow as compared with the frequency F, the charging and discharging effect of the capacitor does not interfere with the negative feedback effect which has been explained in the foregoing.

If the effect is now more finely analysed, it will be observed that when the voltage $V_e$ increases, the voltage $V_1$ applied to the device 5 through the lead 8 increasing, while the amplitude of the pulse supplied by the device 5 is constant (the latter being appropriately constructed for this purpose in known manner), the voltage $V_T—V_1$ between the emitter and the base of the transistor 4 decreases. This has the effect of modifying the characteristics of this transistor, so that its emitter-collector impedance increases. The capacitor 3 therefore discharges through a higher resistance and consequently more slowly. At the end of the constant interval $\Delta T$, therefore, there has been retained a residual charge corresponding to a voltage $V_R$, which increases when the voltage $V_e$ increases. (In FIGURE 2, there is shown a portion of the effect corresponding to an increase of $V_e$ as a function of time).

Finally, it will thus be seen that on the one hand the capacitor is charged with constant current I proportional to $V_e$, while on the other hand the quantity of electricity Q which must be supplied thereto by this current I decreases when $V_e$ increases. It is obvious from this that the charging time $$T_c=\frac{Q}{I}$$

finally decreases more quickly than could be foreseen from the rough law of inverse proportionality to $V_e$. However, since the period of the effect is the sum of this variable charging time and of the charging time $\Delta T$ which remains constant, it may finally be arranged that the said frequency is a strict increasing linear function of $V_e$.

This remarkable result is coupled with the use, in accordance with the invention, of a discharge transistor (4) which is rendered conductive by amplitude- and duration-calibrated pulses and so arranged that the impedance which it places in parallel with the capacitor varies as a function of the voltage $V_e$. In discharging the capacitor only incompletely, while the residual charge of the latter increases with $V_e$, the said transistor compensates in a very smiple manner for the defect of linearity which generally exists in arrangements of the prior art, owing to the fact that the discharge time of the capacitor is constant and is appreciable in relation to the charging time when the frequency exceeds a few hundred c./s.

If it is desired to obtain an absolute compensation, it is desirable to adjust the voltage $V_T$ by appropriate adjustment of the potentiometer 14, or of any equivalent means of adjusting the gain of the transistor 11.

By this adjustment of $V_T$ it is possible to determine the law of variation of the residual charge of the capacitor as a function of $V_e$, so that a substantially completely linear voltage-frequency conversion may be obtained.

It should be noted that the fact that the capacitor retains a residual charge which, by way of non-limiting example, will be of the order of 1/6 of its total charge, has the effect of maintaining the voltage between the emitter and the collector of the transistor 4 at a value which is constantly higher than the saturation voltage, and which therefore does not vary as a function of time and of the operating temperature. Consequently, the emitter-collector impedance, and therfore the period of operation of the arrangement, remains stable as a function of these two parameters.

It will be obvious that various modifications may be made to the illustrated circuit arrangement, the parts of which may be constructed in various ways without departing from the spirit of the invention.

In FIGURE 1, there is shown a contact galvanometer 7 through which the negative-feedback current I passes. For a predetermined value of the said current, and therefore of the voltage $V_e$, such a galvanometer will close its contact and will thus be capable of giving an order to an external circuit.

I claim:

1. A voltage to frequency converter, comprising
(a) a capacitor,
(b) means for charging the capacitor with a current which is proportional to an input voltage,
(c) a threshold triggering device which controls the discharge of the capacitor,
(d) a transistor which controls the discharge of the said capacitor and whose emitter-collector impedance is connected in parallel with the said capacitor, the said threshold triggering device controlled by the said input voltage and connected to the base of the transistor to apply thereto amplitude-and duration-modulated pulses, the input voltage being also applied to either the emitter or the collector of the said transistor.

2. A voltage to frequency converter as recited in claim 1, wherein a differential amplifier is provided having input termnials to one of which terminals is applied the input voltage, and wherein a total feedback loop including a constant-current generator in series with the capacitor connects the output of the diffeerntial amplifier to a resistor connected to its other input terminal.

3. A voltage to frequency converter as recited in claim 1, wherein a variable-gain transistor is connected from the threshold triggering device to the control transistor for the transmission of pulses therebetween.

References Cited

UNITED STATES PATENTS

| | | | |
|---|---|---|---|
| 2,994,825 | 8/1961 | Anderson | 332—9 X |
| 3,022,469 | 2/1962 | Bahrs et al. | 332—1 X |
| 3,040,273 | 6/1962 | Boff. | |
| 3,064,208 | 11/1962 | Bullock et al. | 332—9 |
| 3,293,495 | 12/1966 | Smith | 307—246 X |

ALFRED L. BRODY, Primary Examiner

U.S. Cl. X.R.

332—1, 19; 307—246, 238; 328—67; 321—69